United States Patent [19]

Kouyama et al.

[11] Patent Number: 4,746,698
[45] Date of Patent: May 24, 1988

[54] METHOD OF PREVENTING CORROSION OF APPARATUS FOR MELT-PROCESSING POLYARYLENE THIOETHERS

[75] Inventors: Toshitaka Kouyama; Takao Iwasaki; Takayuki Katto; Zenya Shiiki, all of Iwaki, Japan

[73] Assignee: Kureha Kagaku Kogyo Kabushiki Kaisha, Tokyo, Japan

[21] Appl. No.: 927,825

[22] Filed: Nov. 5, 1986

[30] Foreign Application Priority Data

Nov. 8, 1985 [JP] Japan ............... 60-250444

[51] Int. Cl.⁴ ................... C08K 5/09; C08K 3/22
[52] U.S. Cl. .................... 524/396; 524/433; 524/456; 524/609
[58] Field of Search ............ 524/396, 433, 456, 609

[56] References Cited

U.S. PATENT DOCUMENTS 4,211,687  7/1980  Salee ................... 524/609
4,237,039 12/1980  Blackwell ............. 524/396
4,395,512  7/1983  Kubota et al. ........ 524/433

Primary Examiner—Lewis T. Jacobs
Attorney, Agent, or Firm—Wenderoth, Lind & Ponack

[57] ABSTRACT

Corrosion of a melt-processing apparatus for processing a polyarylene thioether at a temperature higher than the melting point thereof is prevented by a method which comprises adding to 100 parts by weight of the polyarylene thioether 0.001 to 10 parts by weight of at least one member selected from the group consisting of (i) hydroxides of metals of the group IIa of the Periodic Table, (ii) oxides of metals of the group IIa of the Periodic Table and (iii) aromatic carboxylic acid salts of metals of the group IIa of the Periodic Table.

By this method, even if the melt-processing article obtained is exposed to moisture, the electrical properties of the article formed (for example, insulation characteristics) and the water resistance are not substantially deteriorated.

11 Claims, No Drawings

METHOD OF PREVENTING CORROSION OF APPARATUS FOR MELT-PROCESSING POLYARYLENE THIOETHERS

BACKGROUND OF THE INVENTION

1. Field of the Invention

The present invention relates to a method of preventing corrosion of an apparatus for use in processing an article of a polyarylene thioether. More particularly, the present invention relates to a technique of preventing chemical corrosion of a processing apparatus by incorporating into the resin an anticorrosion agent which is a hydroxide or oxide of a metal of the group IIa of the Periodic Table or an aromatic carboxylic acid salt of a metal of the group IIa of the Periodic Table.

2. Description of the Prior Art

A polyarylene thioether has a higher processing temperature than that of an ordinary general-purpose resin and tends to generate a corrosive gas such as sulfurous acid gas ($SO_2$) at a high temperature. Accordingly, a metal portion of a melt-processing machine, which comes into contact with this polymer in molten state during extrusion forming or injection molding, often undergoes corrosion. A ferrous material customarily used for an ordinary processing machine is readily corroded chemically, and a formed article of the polymer is spontaneously colored.

As a measure for solving this problem, there has been proposed a method in which corrosion of a metal is prevented by adding a hydroxide or carbonate of an alkali metal to a polyarylene thioether (as disclosed, for example, in the specification of U.S. Pat. No. 4,017,450). From the results of our research, however, it has been found that since the alkali metal salt can be dissociated into ions, if the formed article comes into contact with moisture, electrical properties (for example, insulation characteristics) and water resistance can be deteriorated, or a significant increase in the melt viscosity can be often caused.

SUMMARY OF THE INVENTION

It is a primary object of the present invention to solve the foregoing problem. It has been found that this object can be attained by using a specific anticorrosion agent for a polyarylene thioether.

More specifically, in accordance with the present invention, there is provided a method of preventing corrosion of a melt-processing apparatus for forming an article wherein a polyarylene thioether is heated at a temperature higher than the melting point thereof, which method comprises adding to 100 parts by weight of the polyarylene thioether 0.001 to 10 parts by weight of at least one member selected from the group consisting of (i) hydroxides of metals of the group IIa of the Periodic Table, (ii) oxides of metals of the group IIa of the Periodic Table, and (iii) aromatic carboxylic acid salts of metals of the group IIa of the Periodic Table.

According to the present invention, corrosion of an apparatus for melt-processing a polyarylene thioether is prevented by using a specific anticorrosion compound.

As pointed out hereinbefore, use of an alkali metal hydroxide or carbonate as an anticorrosion agent for a specific resin has already been proposed. However, it is quite unexpected and surprising that the above-mentioned specific compound of the present invention can attain the foregoing object. That is, even though the compounds (i) and (ii) have a lower solubility in water than that of an alkali metal hydroxide and are hardly dissociated into ions it is not known whether or not they can be uniformly dispersed in a specific resin, that is, a polyarylene thioether, and whether or not they can intercept an approaching acidic gas. A compound that can be contrasted to the compound (iii) is an aliphatic carboxylic acid salt. The compound (iii) is prominently different from an alkali metal salt of an aliphatic carboxylic acid in effect. More specifically, even though the aliphatic carboxylic acid salt is effective as an anticorrosion agent, it has been found that in the case where the aliphatic carboxylic acid salt is present in a polyarylene thioether, when a reinforcing filler or the like is incorporated in the resin, adherence of the additive to the matrix resin is blocked by the aliphatic carboxylic acid salt, resulting in degradation of the mechanical properties of the resin. This phenomenon observed in the aliphatic carboxylic acid salt is probably due to the properties of the salt as a metal soap, and it is interesting that this phenomenon is not observed at all in the case of an aromatic carboxylic acid salt.

According to the present invention, since the specific basic compound is uniformly incorporated in the matrix polymer, even if the thermal decomposition of the polymer is caused at a high temperature, and an acidic gas is generated in the polymer, this basic substance promptly captures the acidic gas. Therefore, a solid or dense article is obtained without corrosion of a metal portion of a forming machine by the acidic gas or formation of voids due to the gas in the article formed during the forming operation.

Accordingly, a special metal material need not be used for the processing apparatus, and an ordinary processing apparatus made of a ferrous material can be used. As an incidental effect, formed articles having reduced spontaneous coloration can be obtained since incorporation of a chemical corrosion product in the resin is not caused.

DETAILED DESCRIPTION OF THE INVENTION

Resin Material

The resin material of the present invention is composed of a polymer having a chain of a polyarylene thioether —AR—S)$_n$ in which Ar stands for an arylene group.

A polymer having a p-phenylene group as the arylene group is preferred in view of its heat resistance and processability or moldability. As the arylene group other than the p-phenylene group, a m-phenylene group

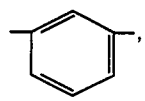

an o-phenylene group

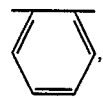

an alkyl-substituted phenylene group

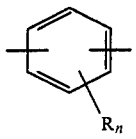

in which R stands for an alkyl group, preferably a lower alkyl group, and n is a number of from 1 to 4, a p,p'-diphenylene-ketone group

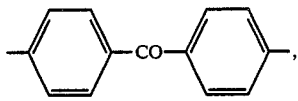

a p,p'-diphenylene group

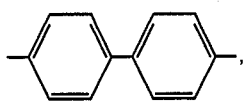

a p,p'-diphenylene-ether group

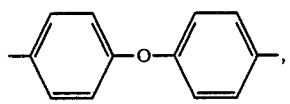

a naphthalene group and a trifunctional unit-containing phenylene group

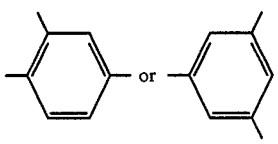

can be mentioned.

This arylene thioether polymer can be synthesized by dehalogenation/sulfidization of an alkali metal sulfide and a dihaloaromatic compound in a polar, aprotic solvent.

The polyarylene thioether can be used singly, or an inorganic filler (such as powders of silica, alumina, titanium oxide, calcium carbonate, calcium silicate, calcium sulfate, calcium phosphate, talc, mica, clay, kaolin, carbon, or glass), a fibrous filler (such as fibers of glass, carbon, aramide, graphite, silica, or whiskers of calcium silicate, potassium titanate, silicon nitride or carbon), a nucleating agent, a crystallization controlling agent, a pigment, a stabilizer, a lubricant or a mold-release agent can be incorporated into the polymer to make a resin material, provide that attainment of the intended effect of preventing chemical corrosion is not substantially obstructed. Moreover, the polymer can be mixed with a polyarylene thioether different in chemical structure or other thermoplastic resin to make a forming or molding material, as long as the physical properties are not substantially degraded. Accordingly, in the expression reading "melt-processing a polyarylene thioether at a temperature higher than the melting point thereof" in the present invention, a mixture or composition as described above is included in the "polyarylene thioether".

Anti-Corrosion Agent

The anti-corrosion agent used in the present invention for preventing corrosion of a processing apparatus in the melt-processing step is a compound having a high effect of preventing chemical corrosion, a low dissociation into ions, a reduced metal soap effect, and a high heat resistance, which is selected from the group consisting of (i) hydroxides of metals of the group IIa of the Periodic Table, (ii) oxides of metals of the group IIa of the Periodic Table, and (iii) aromatic carboxylic acid salts of metals of the group IIa of the Periodic Table.

As the metal of the group IIa of the Periodic Table, there can be mentioned calcium, strontium, barium and magnesium. As the aromatic carboxylic acid forming a salt with a metal as mentioned above, there can be mentioned nucleus-unsubstituted and nucleus-substituted aromatic acids such as phthalic acid, terephthalic acid, pyromellitic acid, naphtoic acid, naphthalic acid, hydroxynaphthoic acid, alkylbenzoic acids and alkylnaphthoic acids (as the substituent at the nucleus, there can be mentioned a hydroxyl group and a lower alkyl group). These compounds can be used singly or in the form of mixtures of two or more of them. Among the foregoing compounds, calcium oxide, calcium hydroxide, magnesium hydroxide, calcium naphthoate and calcium phthalate are especially preferred for attaining the objects of the present invention.

The effective amount of the chemical anti-corrosion agent differs according to the kind of the anti-corrosion agent, but in general, it is preferred that the anti-corrosion agent be incorporated in an amount of 0.001 to 10 parts by weight, especially 0.05 to 5 parts by weight, per 100 parts of the polyarylene thioether. If the amount of the anti-corrosion agent is less than 0.001 part by weight, no substantial effect can be attained by the addition, and if the amount of the anti-corrosion agent is greater than 10 parts by weight, there arises a risk of reduction of the mechanical properties by the addition.

Melt Processing

In the present invention, the above-mentioned chemical anti-corrosion agent is preferably uniformly incorporated in the polyarylene thioether. As the mixing method, there can be mentioned a method in which a predetermined chemical anti-corrosion agent is added to a starting powder of a polyarylene thioether, and the two materials are mixed in the powdery state by a mixer or a blender, and a method in which a solution of a chemical anti-corrosion agent is added to a starting powder of a polyphenylene thioether, and the mixture is stirred and dried.

In the mixing step, other additives such as a reinforcing filler such as inorganic fillers and fibrous fillers, a crystal nucleating agent, a crystallization adjusting agent, a pigment, a stabilizer, a lubricant, a mold-release agent and a thermoplastic resin may be added. When a thermoplastic resin is incorporated, it is preferred that the amount of the thermoplastic resin be up to 90% by weight based on the polyarylene thioether. Specific examples of the reinforcing filler are those mentioned hereinbefore.

The processing apparatus referred to herein collectively includes all machines used for melt-processing the polyarylene thioether. For example, mention can be made of machines and devices, with which the melt of the polyarylene thioether comes into contact in the melt-processing step, such as an extruder, an injection molding machine and a mold. The material of the apparatus is not particularly critical, but the present invention is characterized in that a ferrous material customarily used can be used for a portion with which the molten polyarylene thioether comes into contact.

The processing can be carried out according to customary procedures. Generally, the processing is carried out at a temperature higher than the melting point of the polyarylene thioether. According to the present invention, even if the processing operation is continuously conducted for a long time, metal corrosion is not caused in the processing apparatus, and the polyarylene thioether can be formed into an article of a desired shape such as a pellet, a film, a yarn or the like.

In the article formed, deterioration of the properties of the polymer by incorporation or reaction of a chemical corrosion product (a heavy metal compound or the like) is prevented, and therefore, a polyarylene thioether article formed having reduced spontaneous coloration can be obtained.

The present invention will now be described in detail with respect to the following examples which by no means are intended to limit the scope of the present invention.

Synthesis Example

A titanium-lined polymerization vessel was charged with 370 kg of hydrous sodium sulfate (having water of 54%) and 850 kg of N-methylpyrrolidone (NMP), and water was distilled off while the temerature was elevated to about 200° C. A solution of 310 kg of p-dichlorobenzene and 10 kg of m-dichlorobenzene in 220 kg of NMP was then supplied into the polymerization vessel, and polymerization was carried out at 217° C. for 4 hours. Then, 120 kg of water was added to the reaction mixture, and the temperature was elevated to 263° C. Polymerization was thus further conducted for 4.5 hours. The polymer thus formed was recovered from the liquid reaction mixture by filtration. The solid thus obtained was washed with methanol, neutralized, washed with water and dried to obtain a polymer.

According to the procedure described above, another batch of a polymer was prepared, and both the polymers were blended to prepare a polyarylene thioether (PV-1). The polymer had a melt viscosity of 2,800 poises as determined at a temperature of 310° C. and a shearing rate of 200 sec$^{-1}$.

EXAMPLES 1 THROUGH 7 AND COMPARATIVE EXAMPLES 1 THROUGH 3

PV-1 and a predetermined amount of a chemical anticorrosion agent shown in Table 1 were charged into a Henschel mixer and were mixed to form a homogeneous blend. A part of the blend was placed in a beaker. A ferrous piece was put in the beaker, and the beaker was placed in an oven at 350° C. for 2 hours in a state wherein the molten polymer contacted the iron piece. Then, the beaker was cooled, and the iron piece was taken out and allowed to stand still at room temperature for 3 days. The state of the surface corrosion of the iron piece was examined. The obtained results are shown in Table 1.

The remaining blend was supplied into a single-screw extruder having a pelletizing die with an inner wall composed of nitride steel attached thereto. The screw surface was composed of nitrided steel, and the inner wall of the cylinder was composed of nitrided steel. The blend was supplied in a current of $N_2$ through a hopper, and the resin was melted by heating at 350° C., extruded through the die, quenched in a water tank and cut to form pellets. The content of iron (considered to be mainly derived from the processing machine) in the pellets thus obtained was analyzed by the ICP method (Induced Coupled Plasma analysis method). The obtained results are shown in Table 1.

TABLE 1

| Code | Additive | Amount Added (% by wt.) | State of Corrosion (rusting) | Fe Content* (ppm) | Remarks |
|---|---|---|---|---|---|
| Example 1 | Ca(OH)$_2$ | 0.2 | no substantial rusting | 5 | |
| Example 2 | Mg(OH)$_2$ | 0.4 | " | 8 | |
| Example 3 | CaO | 0.2 | " | 5 | |
| Example 4 | BaO/BaCO$_3$ | 0.1/0.1 | " | 4 | |
| Example 5 | calcium β-naphthoate | 0.4 | " | 7 | |
| Example 6 | calcium phthalate | 0.4 | " | 9 | |
| Example 7 | barium 6-isopropyl-2-naphthoate | 0.4 | " | 6 | |
| Comparative Example 1 | not added | — | rusting (corrosion) on entire surface | 33 | |
| Comparative Example 2 | calcium stearate | 0.3 | no substantial rusting | 6 | |
| Comparative Example 3 | KOH | 0.4 | " | 5 | Processing difficult because of increase of melt viscosity |

Note:
*The Fe content in the starting polymer powder was 1 ppm.

EXAMPLES 8 AND 9 AND COMPARATIVE EXAMPLES 4 AND 5

A part of the blend obtained in each of Examples 1 and 5 and Comparative Examples 1 and 2 was mixed with 40% by weight of a glass fiber (CS3PE-471S supplied by Nittobo), and the mixture was blended again and extruded into a pellet. The pellet was injection-molded into a dumbbell-shaped sample by means of an injection molding machine, the cylinder of which was composed of nitride steel, the screw of stainless steel, and the mold of carbon steel. The Izod strength (as measured according to ASTM D-256) of the sample was determined. The obtained results are shown in Table 2. It is seen that in case of a paraffinic carboxylic acid salt, reduction of the strength is conspicuous.

TABLE 2

| Code | Additive | Amount added (% by wt.) | Izod Strength (kg · cm/cm) (with no notch) |
|---|---|---|---|
| Example 8 | Ca(OH)$_2$ | 0.2 | 39 |

TABLE 2-continued

| Code | Additive | Amount added (% by wt.) | Izod Strength (kg · cm/cm) (with no notch) |
|---|---|---|---|
| Example 9 | calcium β-naphthoate | 0.4 | 34 |
| Comparative Example 4 | calcium stearate | 0.4 | 15 |
| Comparative Example 5 | not added | 0 | 36 |

What is claimed is:

1. A method of preventing corrosion of a melt-processing apparatus for processing a polyarylene thioether at a temperature higher than the melting point thereof, which comprises adding to 100 parts by weight of the polyarylene thioether 0.001 to 10 parts by weight of at least one member selected from the group consisting of $Ca(OH)_2$, CaO, BaO and $BaO/BaCO_3$ admixture.

2. A method according to claim 1, wherein the compound to be added to the polyarylene thioether is calcium oxide or calcium hydroxide.

3. A method according to claim 1, wherein, in the melt-processing apparatus, the portion thereof with which the melt of the polyarylene thioether heated at a temperature higher than the melting point thereof comes into contact is composed of a ferrous metal.

4. A melt-formed article of a thermoplastic resin composition comprising 100 parts by weight of a polyarylene thioether and 0.001 to 10 parts by weight of at least one member selected from the group consisting of $Ca(OH)_2$, CaO, BaO and $BaO/BaCO_3$ admixture.

5. A melt-formed article as set forth in claim 4, wherein the compound to be added to the polyarylene thioether is calcium oxide or calcium hydroxide.

6. A melt-formed article as set forth in claim 4, wherein the thermoplastic resin composition further comprises a reinforcing filler selected from inorganic fillers and fibrous fillers.

7. A method according to claim 2, wherein the compound to be added to the polyarylene thioether is calcium hydroxide.

8. A method according to claim 1, wherein the compound to be added to the polyarylene thioether is barium oxide alone or in admixture with barium carbonate.

9. A melt-formed article as set forth in claim 5, wherein the compound to be added to the polyarylene thioether is calcium hydroxide.

10. A melt-formed article as set forth in claim 4, wherein the compound to be added to the polyarylene thioether is barium oxide alone or in admixture with barium carbonate.

11. A method of preventing corrosion of a melt-processing apparatus for processing a polyarylene thioether at a temperature higher than the melting point thereof, which comprises adding to 100 parts by weight of the polyarylene thioether 0.001 to 10 parts by weight of at least one member selected from the group consisting of calcium naphthoate and calcium phthalate.

* * * * *